UNITED STATES PATENT OFFICE.

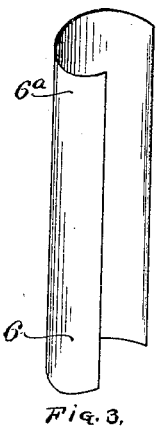
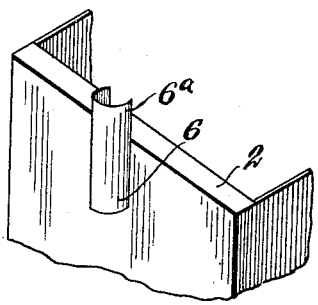
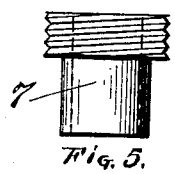
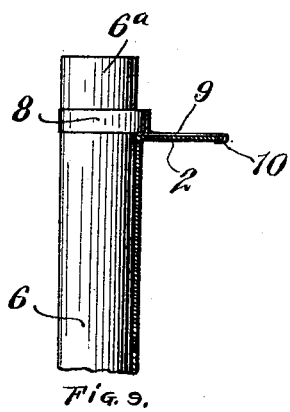
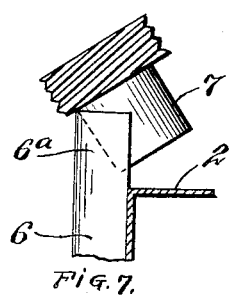
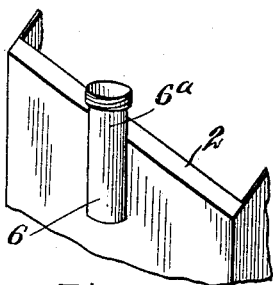
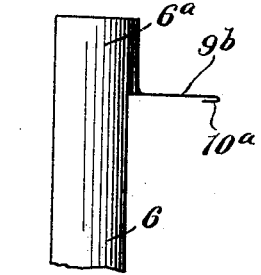
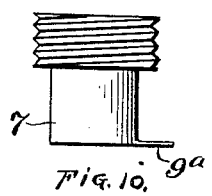
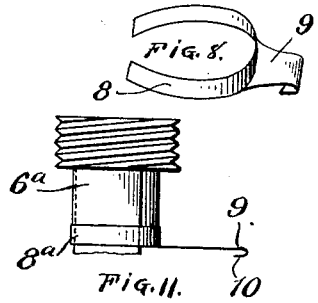
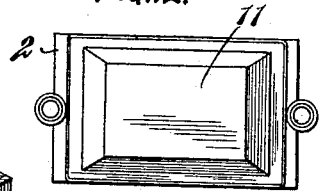
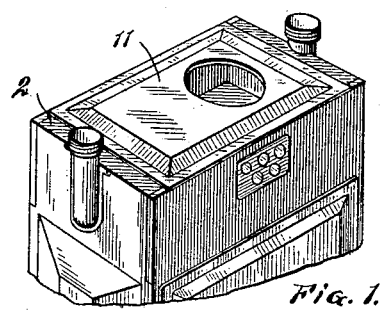

MARSHALL CORNINE, OF MOUNT VERNON, NEW YORK.

GAS-METER.

1,198,192.

Specification of Letters Patent. Patented Sept. 12, 1916.

Application filed April 16, 1915. Serial No. 21,677.

*To all whom it may concern:*

Be it known that I, MARSHALL CORNINE, a citizen of the United States of America, residing at Mount Vernon, in the county of Westchester and State of New York, have invented certain new and useful Improvements in Gas-Meters, of which the following is a specification.

My invention relates to gas meters and it consists in the means by which I attach the side pipe to the main body of the meter.

Figure 1 is a perspective view of a gas meter provided with a side pipe of a form heretofore employed, but found to be expensive and not altogether satisfactory because of the difficulty of making a durably tight joint between brass and tin thus assembled. Fig. 2 is a top plan view of a meter with side pipes, showing particularly how a part of the upper ends of the side pipes projects over the top of the meter. Fig. 3 is a perspective view of a tin part of a side pipe. Fig. 4 is a perspective view of such a tin side pipe secured to a meter top. Fig. 5 is a side view of the brass thimble or threaded connector of the side pipe adapted for use with the pipe of Fig. 3. Fig. 6 shows the side pipe, the meter top and the thimble assembled. Fig. 7 shows such parts as those of Fig. 6 in the positions they are likely to assume when the joint is broken, a common occurrence. Fig. 8 shows a strengthening collar I have devised for preventing the breaking of the said joint. Fig. 9 shows the parts (the meter wall in section) with the said strengthening collar applied and soldered fast. Fig. 10 shows a thimble so formed as to provide an extension projecting directly from its lower edge. Fig. 11 shows a side view of a band formed in a complete circle and adapted to be passed over a side pipe before the thimble is soldered in place. Fig. 12 shows a modified side pipe in which the collar and its extension and hook are formed integral with the pipe itself.

Many efforts have been made to secure this side pipe in such a manner as to hold it firmly and prevent the leaks and breakage which are so frequent and cause much annoyance and no little loss.

As tin is cheaper than brass and may be more firmly soldered to tin than brass can be, efforts have been made to substitute a tin side pipe for the brass side pipe, which is shown in Fig. 1, and is provided with a flange to give space for soldering and rivets to strengthen the joint. By tin as used in this specification, I mean the ordinary tinned sheet iron. In making such substitution, a tin tube like Fig. 3 has been soldered to the meter body, as shown in Fig. 4, and a brass thimble, shown in Fig. 5, inserted into and soldered fast to the part of the pipe projecting above the meter body and to the top of the meter body, as shown in Fig. 6, but it will be noticed that there is nothing, sufficiently strong, for preventing the spreading of the edges of the pipe above the meter body and little opportunity for fastening the lower edge of the thimble to the meter top, since that thimble is of brass which solders but indifferently, and its curved lower edge presents only a thin surface to receive the solder at the joint, moreover each time the cover is removed the hot iron must be passed along the cover's edge, which is plainly shown in Fig. 2, and the heat naturally draws the solder from the joint between the meter top and the bottom edge of the thimble and leaves the joint very insecure, the result being that the thimble is likely to break out as shown in Fig. 7 or the entire top of the side pipe, carrying the thimble, to be broken off from the meter.

I have given much thought to means for economically obviating the annoyance and loss mentioned and to that end have devised a fitting such as is shown in Fig. 8. This form is applicable to structures already complete. It consists of an open band 8, an extension 9 and a hook 10. The open band 8, is adapted to surround the upper end 6ª of the side pipe 6, and the inclosed end of thimble 7, and to be firmly soldered thereto, the tin to tin soldering being especially firm. The extension 9, projects over upon the top 2, of the meter and may be likewise securely soldered, tin to tin, to that top, and the hook 10, will take under the edge of said top and resist a side strain. The band 8, incloses the open edges of the end 6ª of the side pipe and makes that substantially a complete cylinder and the extension 9 furnishes ample surface for securely soldering it to the meter top. As the cover 11, is placed over this extension, its removal is not so likely to disturb the soldering between extension 9 and the top 2, and the *ensemble* provides the economical means for soldering tin to tin so as to create a strong joint capable of withstanding the severe usage which these parts are likely to receive.

In cases where the thimble has not yet been secured to the pipe, I prefer to form the band as a complete circle 8ᵃ, which may be passed over the part 6ᵃ before the thimble 7 is inserted. Then I may place the thimble in the part 6ᵃ and solder all the parts firmly together.

In Fig. 10 I show a modification presenting many but not all of the advantages already described. It has the extension 9ᵃ which may be soldered to the top, and is already firmly secured to the thimble.

Fig. 12 presents another modification in which the part of the side pipe above the top is itself formed into a complete cylinder, thus avoiding the tendency of the sides to spread open and a part of the pipe (cut away to permit a suitable junction with the meter body) is turned out and formed into an extension 9ᵇ and the end is bent over to form a hook 10ᵃ, they together performing the functions and producing the results already set forth.

What I claim as my invention and desire to secure by Letters Patent is:—

1. In a meter, the combination with a side pipe, having a portion of one side cut away, set against the outside of the meter and extending down against a wall of said meter and secured thereto, as set forth, whereby the meter side will partly close said cut side of the side pipe, of an extension projecting from said side pipe and adapted as described, to extend over the meter top and be secured thereto.

2. In a meter, the combination with a side pipe, of an extension adapted as described to extend over the meter top, and provided with a hook adapted as described to hook under the meter top, both extension and hook being adapted as described to be secured to the meter top.

3. In a meter, the combination with a side pipe, of a collar adapted as described to be connected to the pipe, and provided with an extension projecting over the top of the meter and secured thereto.

4. In a meter, the combination with a side pipe, of a collar adapted as described to be connected to the pipe and provided with an extension projecting over the meter top and with a hook taking under the edge of the top, all secured together substantially as set forth.

In testimony whereof, I have signed my name to this specification in the presence of two subscribing witnesses, this 14th day of April, 1915.

MARSHALL CORNINE.

Witnesses:
A. G. N. VERMILYA,
H. M. VERMILYA.